Feb. 23, 1965

T. HEIL 3,170,724

CAMPING TRAILER

Filed May 17, 1963

INVENTOR.
Theodore Heil

BY

Webster & Webster
ATTYS.

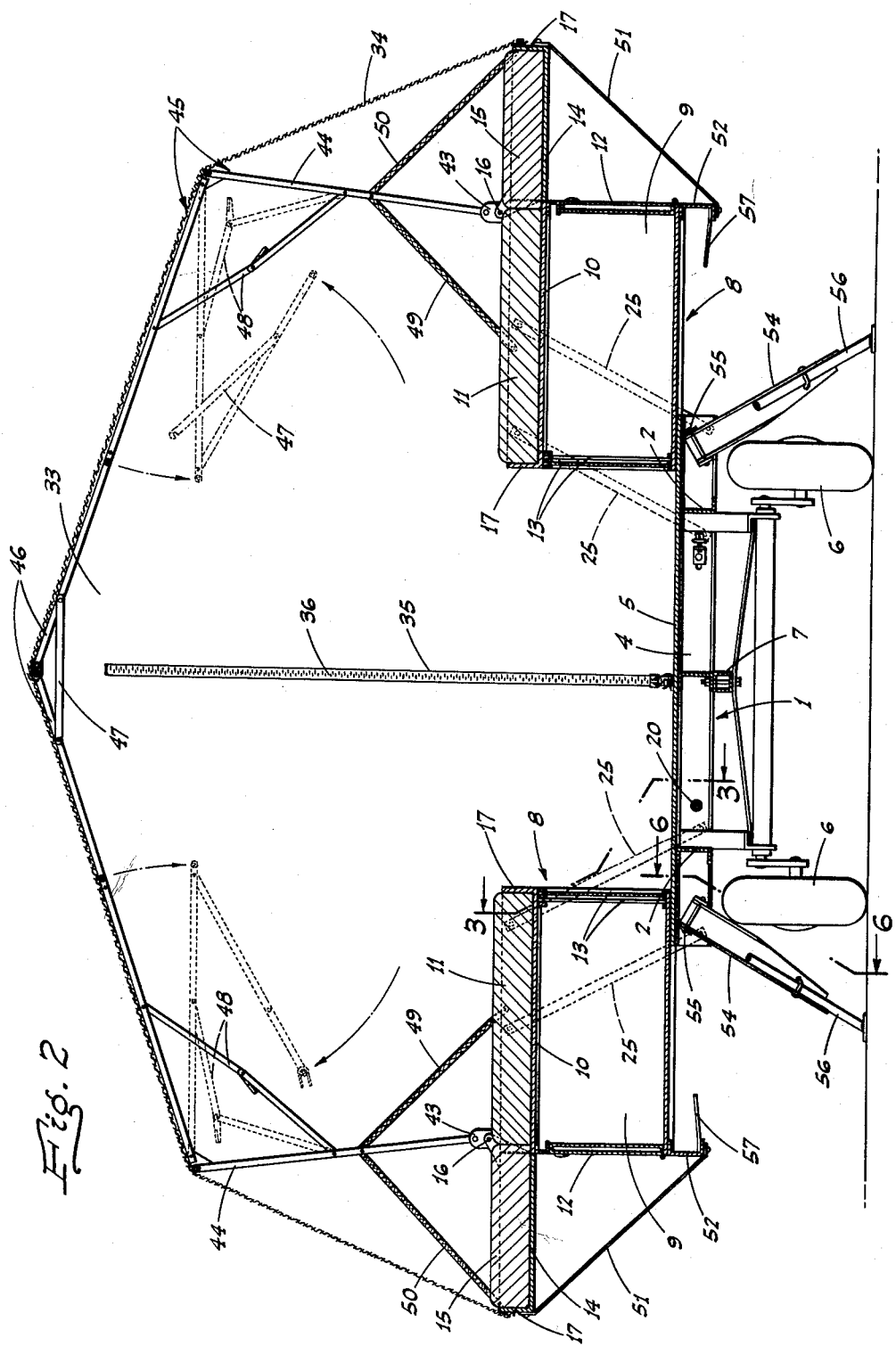

Feb. 23, 1965  T. HEIL  3,170,724
CAMPING TRAILER
Filed May 17, 1963  4 Sheets-Sheet 3
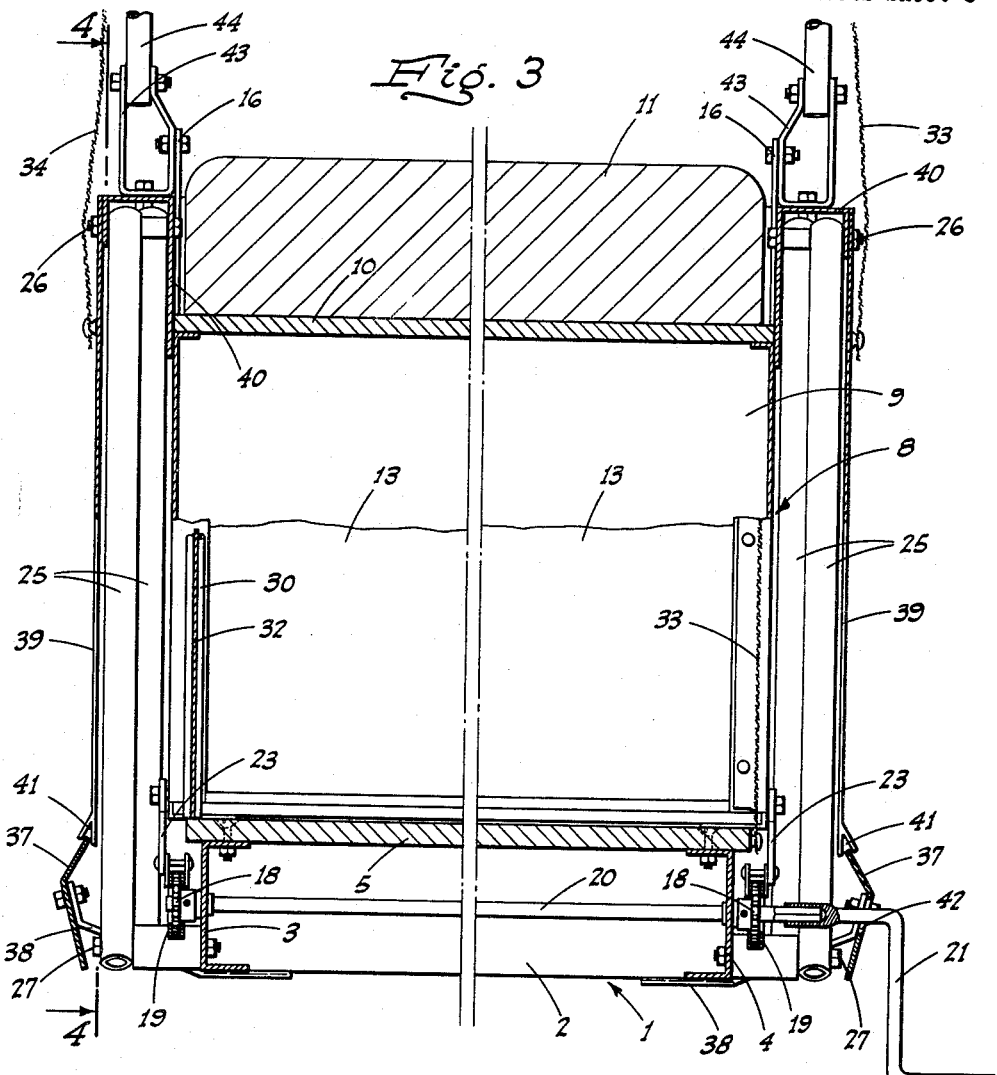

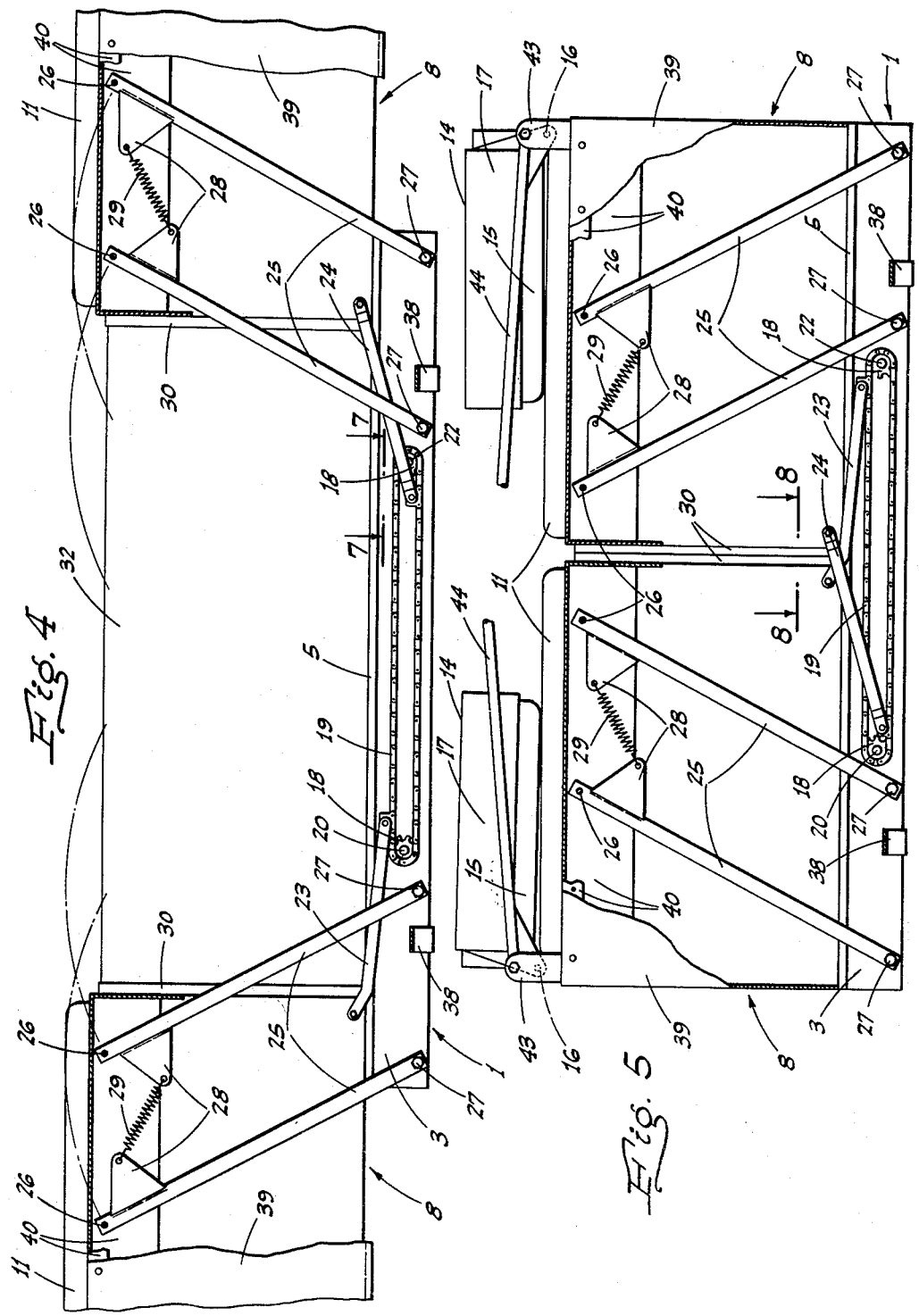

United States Patent Office 3,170,724
Patented Feb. 23, 1965

3,170,724
CAMPING TRAILER
Theodore Heil, Lodi, Calif., assignor to Heilite Trailers, Inc., Lodi, Calif., a corporation of California
Filed May 17, 1963, Ser. No. 281,173
7 Claims. (Cl. 296—23)

The present invention relates in general to an improved camping trailer of folding type.

A major object of the invention is to provide a camping trailer, of the type described, wherein the folded parts are so mounted and controlled that they can be quickly and easily unfolded or moved apart, and a tent erected, by a single person and so as to provide a desirable form of twin bed, camping or living quarters which is fully enclosed, roomy, and convenient to use.

Another important object of the invention is to provide a camping trailer, as above, which includes a pair of longitudinally extending, box-like storage compartment units mounted on the trailer deck for lateral movement between an adjacent position when the trailer is folded for travel, and a transversely spaced position when the trailer is unfolded for camping use; such storage compartment units supporting the bed mattreses.

An additional object of the invention is to provide a camping tralier wherein the mattress-supporting storage compartment units, as in the preceding paragraph, are adapted to receive food, utensils, and other camping supplies or equipment; access to such compartment units being by means of doors on their laterally outer sides accessible from the ground, and other doors on their laterally inner sides accessible from within the trailer.

The trailer, in its unfolded or opened-out form for use, is considerably wider than the span or gauge of the supporting wheels and could thus posisbly tip or teeter should the weight in the trailer be out of balance. It is, therefore, a further object of the invention to provide the trailer with normally folded legs arranged to be readily lowered to a ground-engaging position and which legs will then adequately support and stabilize the trailer, when opened out to full width, against such tipping or teetering.

A still further object of the invention is to provide a camping trailer which, when folded for transport, is no wider than the towing vehicle and considerably lower; this latter feature being advantageous in that there is a minimum of wind resistance to easy towing, and additionally the vehicle driver's vision to the rear is not impaired.

A further object of the invention is to provide a camping trailer which is designed for ease and economy of manufacture.

A still further object of the invention is to provide a practical, reliable, and durable camping trailer, and one which is exceedingly effective for the purpose for which it is designed.

These objects are accomplished by means of such structure and relative arrangement of parts as will fully appear by a perusal of the following specification and claims.

In the drawings:

FIG. 2 is an enlarged transverse section of the trailer in an opened or unfolded position for use; the view looking to the rear.

FIG. 3 is a further enlarged fragmentary and foreshortened longitudinal section of the trailer, taken generally on line 3—3 of FIG. 2.

FIG. 4 is a fragmentary transverse section of the opened trailer, taken on line 4—4 of FIG. 3 and on a reduced scale.

FIG. 5 is a similar view, but showing the trailer parts in closed or folded position.

FIG. 8 is a fragmentary enlarged sectional plan, taken on line 8—8 of FIG. 5.

FIG. 9 is a similar foreshortened view, but showing the corresponding trailer parts in an opened position.

Figure 1:
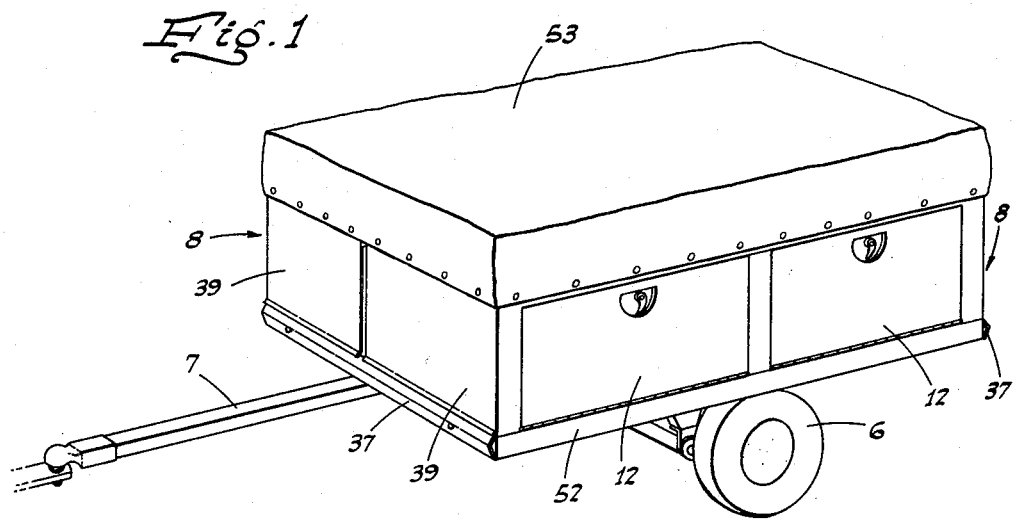
FIG. 1 is a perspective view of the improved camping trailer, in a closed or folded position for transport.

Referring now more particularly to the drawings and to the characters of reference marked thereon, the improved camping trailer comprises a horizontal rectangular main frame indicated generally at 1, and which includes spaced side beams 2, a front cross beam 3, a rear cross beam 4, the cross beams 3 and 4 being wider than the span of the side beams, and a deck 5 covering the frame area and supported on the various beams. The main frame 1 is suitably supported intermediate its ends by a pair of transversely spaced ground engaging wheels 6, and a central tongue 7 projects forwardly from the frame 1 for hitching engagement with the rear end of a towing vehicle, in a conventional manner, as indicated in FIG. 1. It may be noted here that the total width of the trailer frame, and the wheel span, is less than the width of the towing vehicle.

Mounted on the frame 1 in overlying relation to the deck 5, for movement transversely thereof, is a pair of longitudinal storage compartment and mattress supporting units, indicated generally at 8. These units are of identical form and size; each one being as long as the deck 5, and its width substantially one-half that of said deck 5.

Each unit 8 comprises a rectangular storage box 9 having a top deck 10 adapted to support a mattress portion 11. The front of the box (which is at the outer side of the trailer) is provided with a pair of longitudinally spaced downwardly opening hinged doors 12, while the back or inner side is provided with sliding doors, as indicated at 13.

The deck 10 is provided along its outer edge with an extension 14 on which another mattress portion 15 is supported; the deck 10 and extension being hinged together at their ends, as at 16, in such a manner that when the trailer is fully unfolded, said deck 10 and extension 14, and consequently the mattress portions 11 and 15, will lie in horizontal alinement with each other, as shown in FIG. 2. When the trailer is folded, the mattress portions will be disposed in parallel overlying relation with each other, as shown in FIG. 5. The deck 10 and extension 14 are provided, except along their abutting edges, with an upstanding mattress-locating flange 17.

The units 8 are connected together for controlled and simultaneous movement in opposite directions transversely of the frame 1 and across the deck 5 by the following means:

Transversely spaced sprockets 18 are disposed adjacent but outwardly of the cross beams 3 and 4; corresponding sprockets being engaged by an endless chain 19 extending therebetween, as shown in FIGS. 4 and 5. One pair of such sprockets is mounted on a shaft 20 journaled in and extending between the beams 3 and 4; such shaft at its rear end being adapted for detachable engagement with a crank 21 for rotating the shaft. The other pair of sprockets is journaled on individual stub shafts 22 mounted for horizontal adjustment in the corresponding cross beams. A push-pull link 23 is pivoted at one end on the upper run of each chain 19 and thence extends generally horizontally to a pivotal connection with the adjacent end of one of the units 8 close to the bottom thereof, as shown in FIGS. 4 and 5. A similar push-pull link 24 is pivoted at one end on the lower run of each chain 19 and thence extends in a direction opposite that of the link 23 to a connection with the adjacent end of the other unit 8. The links 23 and 24 are arranged in connection with the chain, and relative to each other, so that when the pivoted ends of the links are close to one end of their respective chain runs, the units 8 will be in separated or open-out relation to each other, as shown in FIG. 4. On the other hand, when the pivoted ends of the links are close to the other ends of their respective chain runs, the units 8 will be in closed and substantially abutting relation to each other, as shown in FIG. 5.

In order to hold the units 8 clear of dragging contact with the deck 5 while they are being moved transversely of the deck by the longitudinal travel of the chain runs, each unit 8 at each end is connected to a pair of transversely spaced parallel arms 25. At their upper ends these arms are pivoted, as at 26, on the related unit adjacent the top thereof, and at their lower ends said arms are pivoted, as at 27, on the related cross beam 3 or 4 of the frame 1; said arms being disposed a sufficient distance clear of the ends of each unit 8 so as to also clear the chains 19 and links 23 and 24. The position of the pivots 27 is such that when the units 8 are at the mid-point of their transverse travel, said arms 25 will be vertically disposed, with said units fully raised from the deck 5. When the units 8 are in a fully closed position, the opposite pairs of parallel arms 25 are disposed in angled facing relation to each other and said units 8 are in contact with and supported by the deck 5, as shown in FIG. 5. When, however, the units 8 are in their transversely outermost position, the parallel arms are then similarly but oppositely angled, with said units 8 again in contact with the deck 5, as shown in FIG. 4. Since the units 8 then extend in the main laterally out from the deck 5 and only the laterally innermost portions thereof are supported by the deck 5, the parallel bars 25 then, by reason of their angled position, support the units 8 in the necessary horizontal and level relation to the deck 5, and so that neither unit will be tilted down by weight imposed thereon as by a person sitting or reclining on the related mattress.

In order to aid in the movement of the units 8 from one position to the other, and thus reduce the force needed to operate the crank 21, the arms 25 of each pair are provided adjacent their upper ends with brackets 28 disposed in facing relation to each other; these brackets, at their outer ends and at the same distance from the adjacent ends of the related arms, being connected to the ends of tension springs 29. Due to the relationship of the brackets to each other when the arms 25 are angularly disposed at either end of the travel of the units 8, the springs 29 are then in their position of greatest tension, such tension lessening as the parallel arms move toward a vertical position.

When the units 8 are in a closed position relative to each other, a weather-tight seal between said units at their ends is formed by means of vertical sealing strips 30 secured against the adjacent end faces of said units 8, and preferably formed of tubular rubber, as shown in FIG. 8. These strips 30, at least those at the forward end of the units 8, are each formed with a vertical slot 31; the slots of the two strips being disposed in facing relation to each other to provide locating and retaining guides for a vertical rectangular plate 32 which, when in place, spans the space otherwise left open when the units 8 are separated. At the rear end of the trailer, such a plate is unnecessary, since the space in question is then covered or closed by the end sheet 33 of the canvas enclosure or tent 34 when erected over the trailer. It should be noted that said end sheet 33 is formed with a central vertical slit 35 which provides an entry opening for the tent, and which opening may be closed by a conventional slide fastener, indicated at 36.

The chains and sprockets, for moving the units 8, are concealed from the front and back of the frame 1 by bumper strips 37; each being secured to the adjacent cross beam of frame 1 by brackets 38, as shown in FIG. 3. In addition, the parallel arms 25 are fully enclosed, when the units 8 are in a closed position, by end plates 39 depending from the top of said units 8 and secured at their upper ends to inverted channel members 40. Such members 40 are rigidly secured to the adjacent ends of said units 8, and which also form the supports for the upper end pivots of the arms 25. At their lower ends, said end plates 39 are formed with downwardly facing grooves 41 which engage over the upper edges of the bumper strips 37 when the units 8 are in their lowered at-rest position at either end of their transverse movement. It will be noted that the rear bumper strip 37 has an opening 42 therethrough which is alined with the shaft 20, so that the rear end of said shaft is exposed for engagement by the crank 21. The above described features are all clearly shown in FIG. 3.

The tent 34 it foldably supported as follows:

Secured on and upstanding from the top of each member 40 at the laterally outer end thereof is a bracket 43 to which is hinged the lower end of a substantially vertical leg 44 of a tent-supporting frame, indicated generally at 45; there being two of such frames, one at each end of the trailer. The opposed legs 44, at their upper ends, are pivotally connected to the adjacent ends of an articulated ridge pole unit 46 which is separable at the apex and foldable in a downward direction, as indicated in dotted lines in FIG. 2. When each frame 45 is fully erected, the ridge pole unit 46 is of wide angle inverted V form, as shown. The apex of such unit 46 is then prevented from downward folding or separation by a horizontal strap 47 below and spanning the apex; such strap being permanently pivoted at one end, and detachably connected at its other end.

At its ends, each ridge pole unit 46 is releasably held erected relative to the adjacent leg 44 by means of a foldable diagonal brace 48 extending therebetween, while the leg is held in its erected position by angled or diagonal flexible guys 49 and 50. The guy 49 extends from said leg at a point below the brace 48 to a connection with the adjacent unit 8. The other guy 50 extends from said point on the leg to a connection with the laterally outermost portion of the flange 17 on the extension 14.

Each side portion of the tent 34 extends downwardly from the junction of the adjacent frame leg 44 with the ridge pole unit 46 to a connection with the adjacent flange 17, as shown in FIG. 2.

The tent-supporting frames 45 are preferably connected together for simultaneous erection or folding, by longitudinal rods which span between such frames at corresponding points of pivotal connection of the parts thereof; such rods, not here shown in detail, being substantially conventional in folding tent frames of the same general type.

In order to prevent upward swinging movement of the extensions 14 due to the upward pull of the tent sides and the guys 50 thereon, each extension 14 is releasably held in its horizontal opened-out position by a tension strap 51 extending downwardly from the laterally outer end of said extension to a detachable connection with a longitudinally extending stiffening beam 52 secured on and extending along and under the adjacent unit 8 at the bottom thereof. This strap is disposed centrally of the ends of the unit 8, or between the doors 12 so as not to interfere with the opening thereof. The beam 52 is horizontally alined with the frame 1 and arranged to engage the laterally outer ends of the frame beams 3 and 4 when the units 8 are in a closed position.

Figure 6:
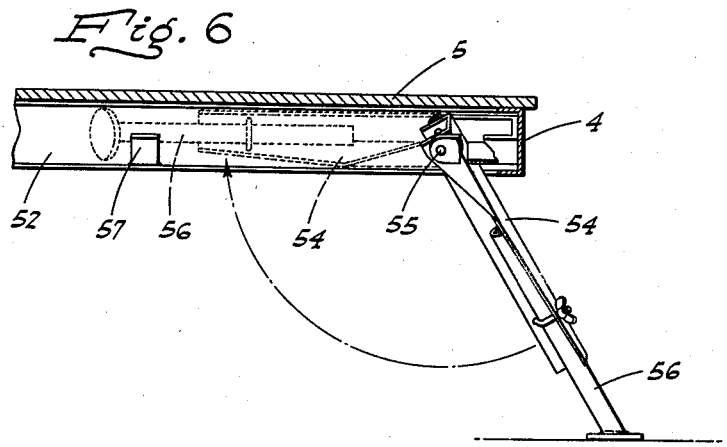
FIG. 6 is a fragmentary enlarged longitudinal section, showing the mounting of one of the foldable stabilizer legs, taken on line 6—6 of FIG. 2.
Figure 7:
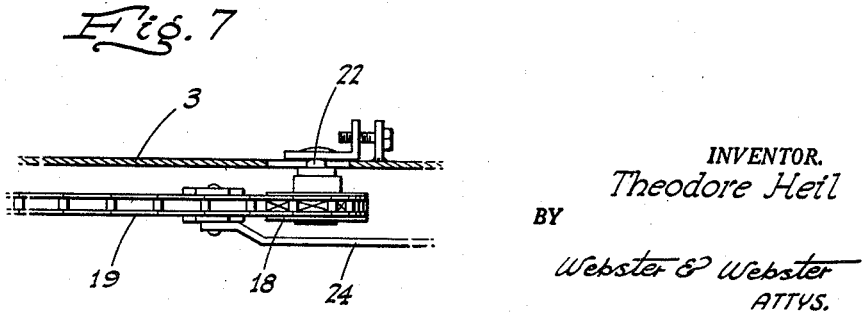
FIG. 7 is a fragmentary enlarged sectional plan, taken on line 7—7 of FIG. 4.

Inasmuch as the trailer when opened out is considerably wider than the span or gauge of the wheels 6, it would tend to tip or teeter unless some supporting means was provided in addition to the wheels. A stabilizer leg 54 is therefore pivotally mounted at its upper end, as at 55, on each frame beam 3 and 4 adjacent each end thereof and for movement between a horizontal folded position in which said leg extends lengthwise of the trailer toward the opposite end thereof, and a depending ground engaging position in which the leg extends at an outward angle to the ground and also diagonally with respect to the horizontal plane of the frame 1. Each leg 54 includes a longitudinally adjustable outer end footed portion 56, so that the length of any leg may be adjusted independently of the others as ground variations may require to maintain the trailer in a level condition. The legs after being folded—an operation which must be performed before the units 8 are moved to a closed position—are than held against outward and downward movement by means of fingers 57 projecting laterally inward from the opposed beams 52 in position to engage against the footed portions 56 of the legs, as indicated in FIG. 6.

For transport of the trailer, the tent-supporting frames, and the flexible tent itself, may be readily folded down over the mattresses after the units 8 are moved to a closed position, and the extensions 14 are folded onto the mattress portions 11. With the various parts thus folded and compacted together, they are protected from the weather and other elements by a detachable tailored-to-fit buttoned-on cover 53, as shown in FIG. 1.

In order to open out the trailer and erect the tent for use, the first step is to remove the cover 53. Then by application of the crank 21 to the shaft 20, the opposed units 8 are opened out or separated, as previously described. The opening or outward movement of said units 8 exposes the legs 54 so that they may be swung down to their trailer stabilizing position. The extensions 14 are then swung outwardly and down to horizontal, an operation which automatically lifts the frame legs 44 to their substantially vertical position. The straps 51 are then attached to the beams 52 to maintain the extensions 14 in the necessary unfolded position. It is then an easy matter to unfold and erect the ridge pole units 46 and, of course, the tent 34 supported thereby, to an operative position.

From the foregoing description, it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A camping trailer comprising a frame which includes a deck, a pair of separate mattress-supporting units extending lengthwise of the trailer in laterally opposed relation, means mounting the units in connection with the frame for lateral movement between a position on the deck adjacent each other and a position in contact with the deck but in relatively widely separated relation, and mechanical manually controlled means to move the units from one position to the other simultaneously comprising a pair of horizontally alined sprockets at each end of the frame spaced apart a greater distance than the full lateral movement of the units, an endless chain extending about the sprockets, a push-pull link extending in one direction from the upper run of the chain and connected to said run and to one unit, another push-pull link extending in the opposite direction from the lower run of the chain and connected to said lower run and to the other unit, and means to rotate one sprocket so as to drive the chain in one direction or the other.

2. A camping trailer comprising a frame which includes a deck, a pair of separate mattress-supporting units extending lengthwise of the trailer in laterally opposed relation, means mounting the units in connection with the frame for lateral movement between a position on the deck adjacent each other and a position in contact with the deck but in relatively widely separated relation, vertical sealing strips on the laterally inner sides of the units at the ends thereof adapted to contact each other when the units are in such adjacent relationship, the strips at one end of the units being grooved in facing relationship, and a plate having parallel side edges adapted to removably engage in the grooves from above when the units are fully separated.

3. A trailer comprising a wheel-supported rectangular horizontal frame having a full-width deck thereon, a pair of longitudinal box-like units supported on the deck for lateral movement thereon from a position adjacent each other to a position mainly laterally out from the deck, legs mounted on the frame at the corners thereof for swinging movement between a folded position along the frame to a depending ground-engaging position at an angle thereto and diagonally of the frame, and means on the units preventing unfolding movement of the legs until said units are moved to their laterally out position relative to the deck.

4. A trailer comprising a wheel-supported rectangular horizontal frame having a full-width deck thereon, a pair of box-like units supported on the deck for lateral movement thereon from a position adjacent each other to a position mainly laterally out from the deck, legs mounted on the frame at the corners thereof for a swinging movement between a ground-engaging position and a raised horizontal position extending along the sides of the frame, a longitudinal beam secured on and under each unit at the laterally outer side thereof and alined with the frame in position to enclose the adjacent folded leg when the unit is in a laterally inward position, and an element on said beam to then engage such folded leg and hold the same in such folded position.

5. A trailer comprising a frame which includes a deck, a pair of separate box-like storage and occupant-supporting units extending lengthwise of the trailer and mounted on the frame in laterally opposed relation, means mounting the units in connection with the frame for lateral movement between a position on the deck adjacent each other and a position in which the units are relatively widely separated, and a downwardly foldable tent-supporting frame mounted on the units and adapted for unfolding when the units are in their laterally outermost position; each box-like unit including a laterally foldable extension along its outer upper edge adapted to be unfolded when said unit is moved laterally out and to then extend laterally out from said unit; the tent-supporting frame including laterally opposed foldable legs at each end of the trailer, and an articulated ridge pole unit arranged to extend between the upper ends of the legs when unfolded; and means mounting each leg in connection with the related box-like unit and extension for automatic unfolding movement of such leg to a substantially vertical position upon said extension being moved to its unfolded position.

6. A trailer, as in claim 5, in which the leg mounting means includes a pivotal connection between the lower end of each leg and the related box-like unit at the top and laterally outer edge thereof; there being diagonal flexible guys connected between each leg intermediate its ends and said box-like unit and extension.

7. A trailer, as in claim 6, with a tension strap connected at one end to the outer edge of each extension, and adapted at its other end for detachable connection with the related box-like unit adjacent the bottom thereof.

References Cited by the Examiner

UNITED STATES PATENTS 1,864,047   6/32   Lawhorne _____ 296—23

FOREIGN PATENTS

| 461,624 | 2/37 | Great Britain. |
| 493,964 | 10/38 | Great Britain. |
| 686,609 | 1/53 | Great Britain. |
| 20,436 | 12/35 | Australia. |
| 508,536 | 2/52 | Belgium |
| 549,525 | 10/56 | Italy. |
| 998,255 | 9/51 | France. |

A. HARRY LEVY, *Primary Examiner.*